(12) United States Patent
Cooper et al.

(10) Patent No.: US 7,596,709 B2
(45) Date of Patent: *Sep. 29, 2009

(54) CPU POWER MANAGEMENT BASED ON UTILIZATION WITH LOWEST PERFORMANCE MODE AT THE MID-UTILIZATION RANGE

(75) Inventors: Barnes Cooper, Tigard, OR (US); Jalaleddin Arjangrad, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 11/478,119

(22) Filed: Jun. 28, 2006

(65) Prior Publication Data

US 2007/0016815 A1   Jan. 18, 2007

Related U.S. Application Data

(63) Continuation-in-part of application No. 11/006,872, filed on Dec. 7, 2004, now abandoned, which is a continuation of application No. 09/751,759, filed on Dec. 30, 2000, now Pat. No. 6,829,713.

(51) Int. Cl.
   *G06F 1/32* (2006.01)
(52) U.S. Cl. .................................. 713/323; 713/320
(58) Field of Classification Search ................ 713/320, 713/323
   See application file for complete search history.

(56) References Cited

U.S. PATENT DOCUMENTS

| | | | |
|---|---|---|---|
| 4,485,440 A | 11/1984 | Duff et al. | |
| 5,021,679 A | 6/1991 | Fairbanks et al. | |
| 5,072,376 A | 12/1991 | Ellsworth | |
| 5,153,535 A | 10/1992 | Fairbanks et al. | |
| 5,307,003 A | 4/1994 | Fairbanks et al. | |
| 5,349,688 A | 9/1994 | Nguyen | |
| 5,564,015 A | 10/1996 | Bunnell | |
| 5,623,647 A | 4/1997 | Maitra | |
| 5,627,412 A | 5/1997 | Beard | |
| 5,710,929 A | 1/1998 | Fung | |
| 5,719,800 A | 2/1998 | Mittal et al. | |
| 5,745,375 A | 4/1998 | Reinhardt et al. | |
| 5,752,011 A | 5/1998 | Thomas et al. | |
| 5,787,294 A | 7/1998 | Evoy | |
| 5,815,693 A | 9/1998 | McDermott et al. | |
| 5,974,557 A | 10/1999 | Thomas et al. | |
| 5,982,814 A | 11/1999 | Yeh et al. | |
| 6,006,336 A | 12/1999 | Watts et al. | |
| 6,105,142 A | 8/2000 | Goff et al. | |
| 6,118,306 A | 9/2000 | Orton et al. | |
| 6,192,479 B1 | 2/2001 | Ko | |
| 6,212,644 B1 | 4/2001 | Shimoda et al. | |
| 6,216,235 B1 | 4/2001 | Thomas et al. | |

(Continued)

*Primary Examiner*—Tse Chen
(74) *Attorney, Agent, or Firm*—Blakely, Sokoloff, Taylor & Zafman LLP

(57) ABSTRACT

A demand-based method and system of a processor power management is described. A processor is caused to enter a particular performance mode based on a first and a second utilization threshold. The particular performance mode includes at least a first performance mode, a second performance mode, and a third performance mode. The processor is caused to operate with a clock frequency in the third performance mode that is lower than the clock frequency of the processor in the first and second performance modes.

14 Claims, 9 Drawing Sheets

U.S. PATENT DOCUMENTS

| | | |
|---|---|---|
| 6,272,642 B2 | 8/2001 | Pole, II et al. |
| 6,470,456 B1 | 10/2002 | Chung-Chih |
| 6,487,668 B2 | 11/2002 | Thomas et al. |
| 6,557,108 B1 | 4/2003 | Moore et al. |
| 6,574,739 B1 | 6/2003 | Kung et al. |
| 2003/0061523 A1* | 3/2003 | Stanley ....................... 713/300 |
| 2006/0184287 A1* | 8/2006 | Belady et al. ............... 700/291 |

* cited by examiner

CPU POWER MANAGEMENT BASED ON UTILIZATION WITH LOWEST PERFORMANCE MODE AT THE MID-UTILIZATION RANGE

RELATED APPLICATIONS

This application is a continuation-in-part application of U.S. application Ser. No. 11/006,872 filed on Dec. 7, 2004 now abandoned, which is a continuation application of U.S. application Ser. No. 09/751,759 filed Dec. 30, 2000, now issued as U.S. Pat. No. 6,829,713.

TECHNICAL FIELD

The field of the invention relates generally to central processing units (CPUs). More particularly the field invention relates to CPU power management. Still more particularly, the field of the invention relates to a demand-based method and system of CPU power management.

BACKGROUND

As battery-dependent portable computing devices (notebook computers, personal digital assistants, etc.) have become more prevalent, the conservation of battery power or "power management" has become more and more important. In many power management systems, some or all system components may be deactivated or "powered down" to conserve power. This method however, requires that the devices powered down be inactive or unused for a sufficiently long period of time to justify the latency associated with their re-activation. Therefore, a number of methods have been implemented to decrease device power consumption within the active or "powered on" state. Since, the power dissipated by a device is dependent both on its applied voltage and on the frequency with which device transitions or "switching" occurs, conventional power management techniques typically focus on one or both of these factors.

Modem power management systems implement a variety of voltage and frequency reduction or "scaling" techniques. Although substantial power savings can be realized by reducing a device's voltage, special hardware is often required to correctly operate such devices using low and variable voltages. Such voltage reduction techniques also currently limit the maximum frequency at which a device may be operated. Similar power savings may be realized by scaling a device's operating frequency or "clock". In conventional power management systems, a device's operating frequency may be altered in a variety of ways. In one approach, the applied clock signal is periodically stopped and restarted such that the average or effective operating frequency is lowered (throttling). In another approach, a lower frequency clock signal, generated independently or derived from an existing clock, is applied to a device. Although these approaches may be used alone or in combination to reduce a device's or system's power consumption, this frequency scaling technique reduces the operating frequency of the device, and consequently the number of operations or tasks it can perform.

In the past, several approaches have been taken to control the activation of the above-described power management techniques such as the user selection of a pre-defined power mode, the occurrence of environmental events such as the application or removal of an A/C (alternating current) power source, or the detection of a system or device temperature. More recently, power management systems have looked to device utilization or "idleness" to trigger the application or removal of such techniques in an effort to conserve power in a more user-transparent manner. When a utilization-based power managed device is idle for a pre-determined period of time, power reduction techniques such as voltage and frequency scaling are applied to decrease the amount of power consumed. The greatest difficulty traditionally associated with such demand-based systems has been in determining a device's current utilization, particularly for processing devices such as the central processing unit (CPU) of a data processing system.

In a conventional operating system (OS), CPU utilization is determined by accumulating CPU idle time across a sampling interval to determine the percentage of time the processor is inactive. To accomplish this, a list of tasks or threads is maintained by the OS which are ready-to-run, i.e., not waiting for some event to resume execution. When this ready-to-run list is empty, no tasks are being executed and the processor is idle. Accordingly, a CPU-independent timer is read and the processor is placed in a low power state. When a new task is added to the ready-to-run list, the processor is placed in an active state and the timer is read again. The difference between the first and second timer reads (multiplied by the timer's period) then represents the CPU's idle time. The accumulation of this time across a sampling interval is then used to determine the CPU utilization (what percentage of the CPU's time is spent idle). Unfortunately, neither this measure of CPU utilization nor the state of the ready-to-run task list is available outside of the OS through a supported application programming interface (API). Consequently, this OS-generated CPU utilization metric cannot be utilized in a "demand" or utilization-based power management system.

BRIEF DESCRIPTION OF THE DRAWINGS

The present invention is illustrated by way of example, and not by way of limitation, in the figures of the accompanying drawings.

FIG. 1a illustrates a conventional data processing system useable with the present invention;

FIG. 1b illustrates a prior art architecture of the data processing system depicted in FIG. 1a;

DETAILED DESCRIPTION

A demand-based method and system of CPU power management is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figures 1A, 1B:
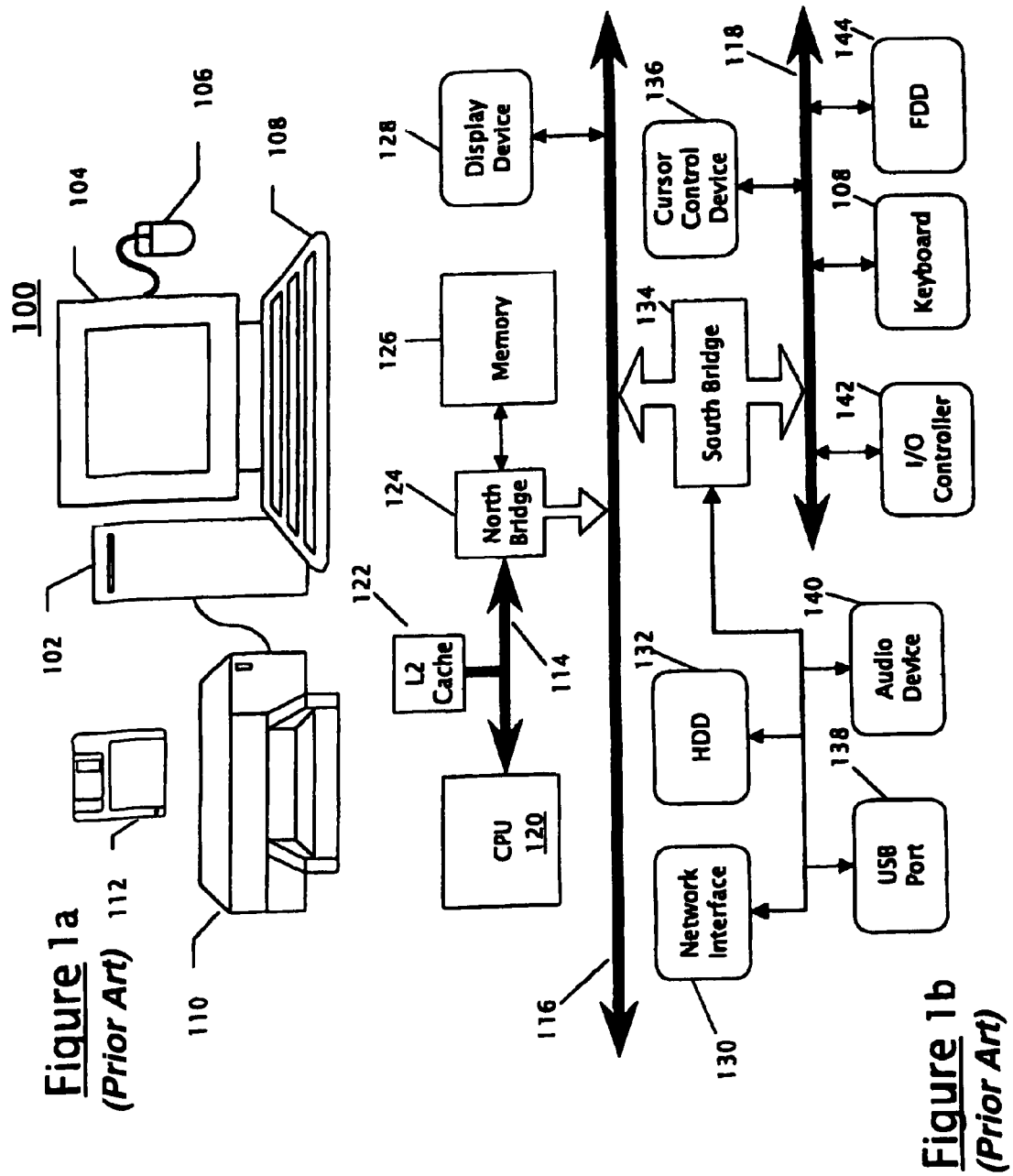

Referring now to FIG. 1a, a conventional data processing system 100 useable with the present invention is illustrated. Data processing or computer system 100 is comprised of a system unit 102, output devices such as display 104 and printer 110, and input devices such as keyboard 108, and mouse 106. Data processing system 100 receives data for processing by the manipulation of input devices 108 and 106 or directly from fixed or removable media storage devices such as disk 112 and network connection interfaces (not shown). Data processing system 100 then processes data and presents resulting output data via output devices such as display 104, printer 110, fixed or removable media storage devices like disk 112 or network connection interfaces.

Referring now to FIG. 1b, there is depicted a high-level block diagram of the components of a data processing system 100 such as that illustrated by FIG. 1a. In a conventional computer system, system unit 102 includes a processing device such as central processing unit (CPU) 120 connected to a level two (L2) cache 122 over a processor system bus (PSB) 114. Processor system bus 114 is in turn coupled to an expansion bus such as local bus 116 and a memory 126 via a north bridge circuit 124. Local bus 116 may include a peripheral component interconnect (PCI), Video Electronics Standards Association (VESA) bus or the like, tightly coupled to the processor 120 and the processor system bus 114 to permit high-speed access to select devices such as display device 128.

Memory 126 may include read-only (ROM) and/or random access (RAM) memory devices such as a synchronous dynamic random access memory (SDRAM) module capable of storing data as well as instructions to be executed by CPU 120. Access to data and instructions stored within memory 126 is provided via a memory controller (not shown) within north bridge circuit 124. L2 cache 122 is similarly used, typically in a hierarchical manner, to store data and instructions for direct access by CPU 120. Display device 128 may include a cathode ray tube (CRT) display such as display 104, liquid crystal display (LCD), or a similar device for displaying various kinds of data to a computer user. For example, image, graphical, or textual information may be presented to the user on display device 128. System unit 102 of data processing system 100 also features an expansion or "compatibility" bus 118 such as the Industry Standard Architecture (ISA) bus, and a south bridge circuit 134 coupling it to local bus 116 to facilitate the attachment of other, relatively slower devices to the system 100. South bridge circuit 134 includes a universal serial bus (USB) port 138 as well as other direct connections for devices such as a network interface card 130, a data storage device, such as a magnetic hard disk drive 132, and an audio device 140 such as a speaker or sound card.

Other devices not directly coupled to south bridge 134 may be connected to the system 100 via the expansion bus 118 as illustrated. A floppy disk drive (FDD) 144 providing additional data storage capacity on removable media storage devices such as disk 112, and input devices such as a keyboard 108 and a cursor control device 136 are each coupled to expansion bus 118 in this manner to communicate data, instructions, and/or command selections to central processing unit 120. Cursor control device 136 may comprise a conventional mouse such as mouse 106 of FIG. 1a, a trackball, or any other device capable of conveying desired cursor manipulation. Similarly, expansion bus 118 includes an input/output (I/O) controller having standard serial and parallel port functionality for connecting other I/O devices, such as printer 110 to the system.

The system of the present invention includes software, information processing hardware, and various processing steps, which will be described below. The features and process steps of the present invention may be embodied in machine or computer executable instructions embodied within media such as disk 112. The instructions can be used to cause a general purpose or special purpose processor such as CPU 120, which is programmed with the instructions to perform the described methods of the present invention. Alternatively, the features or steps of the present invention may be performed by specific hardware components that contain hard-wired logic for performing the steps, or by any combination of programmed computer components and custom hardware components.

Figure 2:
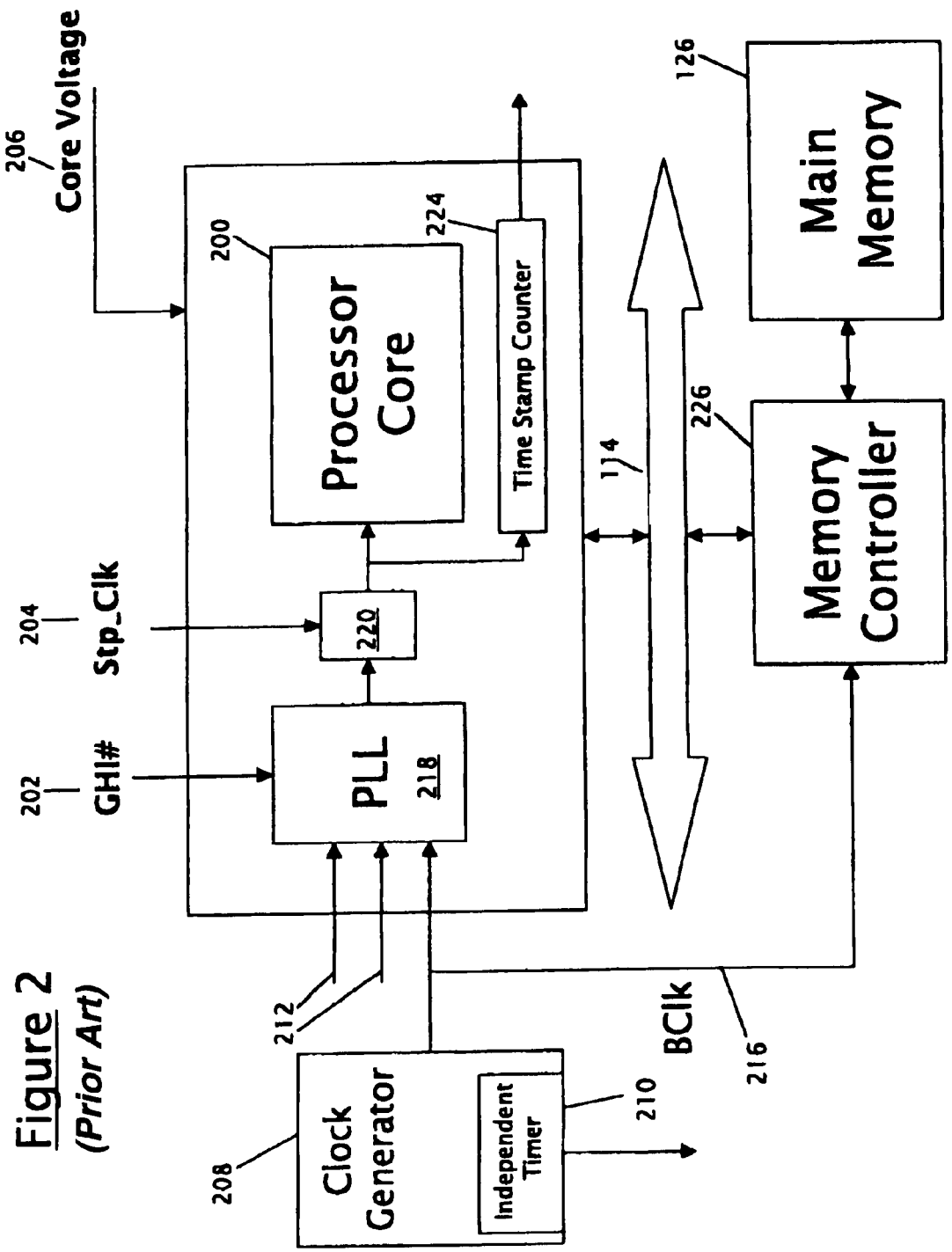
FIG. 2 illustrates a portion of the architecture depicted in FIG. 1b in greater detail.

Referring now to FIG. 2, a portion of the architecture depicted in FIG. 1b is illustrated in greater detail. Processor 120 is shown in communication with memory 126 over the processor system bus 114 utilizing a memory controller 226 of north bridge circuit 124. A common system clock, (BClk) 216 is generated by a clock generator 208 and applied to a clock control phase lock loop (PLL) 218 of CPU 120 and to memory controller 226. A core voltage 206 is similarly applied to CPU 120 in the illustrated embodiment, providing necessary operating power. While the BClk signal 216 is applied, accesses to and from memory 126 occur at its frequency of approximately 100 megahertz (MHz). The central processing unit 120 however, is capable of performing tasks at much greater speeds than this and accordingly, a bus ratio or multiplier 212 is selected using a clock control signal, GHI# 202 and a higher frequency central processing unit clock signal is generated utilizing PLL 218. So for example, if the system or front side clock 216 has a frequency of 100 MHz, and a ratio 212 of 5 to 1 is selected using the GHI# signal 202, then the generated CPU clock will have a frequency of approximately 500 MHz. Alternatively, a higher multiplier or ratio 212 of say 7 to 1 could be selected, yielding a CPU clock frequency of approximately 700 MHz.

The generated central processing unit clock signal is then applied to clock throttling logic 220 before being passed to processor core 200. Throttling is a technique by which the CPU clock is deasserted or "gated off" from the processor core to prevent functional units within the core from operating. Throttling logic 220 therefore acts as a switch, actuated by a stop clock (Stp_Clk) control signal 204, between the PLL 218 and the processor core 200. A time stamp counter 224 is also included within the CPU 120 and incremented for each cycle (sometimes called ticks or pulses) of the CPU clock which is "gated through" or applied to the processor core as shown. Because time stamp counter 224 tracks the number of clock ticks or cycles applied to the functional units of the processor core 200 such as instruction decoders, floating point and integer execution units, etc. it provides an extremely accurate representation of the actual work performed by CPU 120. One additional chipset architecture component illustrated in FIG. 2 is independent timer 210. System independent timer 210 runs independently of CPU 120 and its associated system clock 216, unaffected by Stp_Clk signal 204 throttling or BClk signal 216 frequency modifications. Using the number of ticks of independent timer 210 elapsed between reads and its fixed frequency, an accurate measure of the passage of time may be obtained. In one embodiment, a Windows™ high performance counter, exported via the Win32 Application Programming Interface (API) as the QueryPerformanceCounter( ) function can be used as independent timer 210. In an alternative, Advanced Configuration and Power Interface (ACPI) compliant embodiment, a power management timer may be utilized. Although in the illustrated embodiment independent timer 210 is depicted as being integrated with clock generator circuit 208, in alternative embodiments the timer 210 may be generated in a separate device or integrated circuit.

Figure 3:
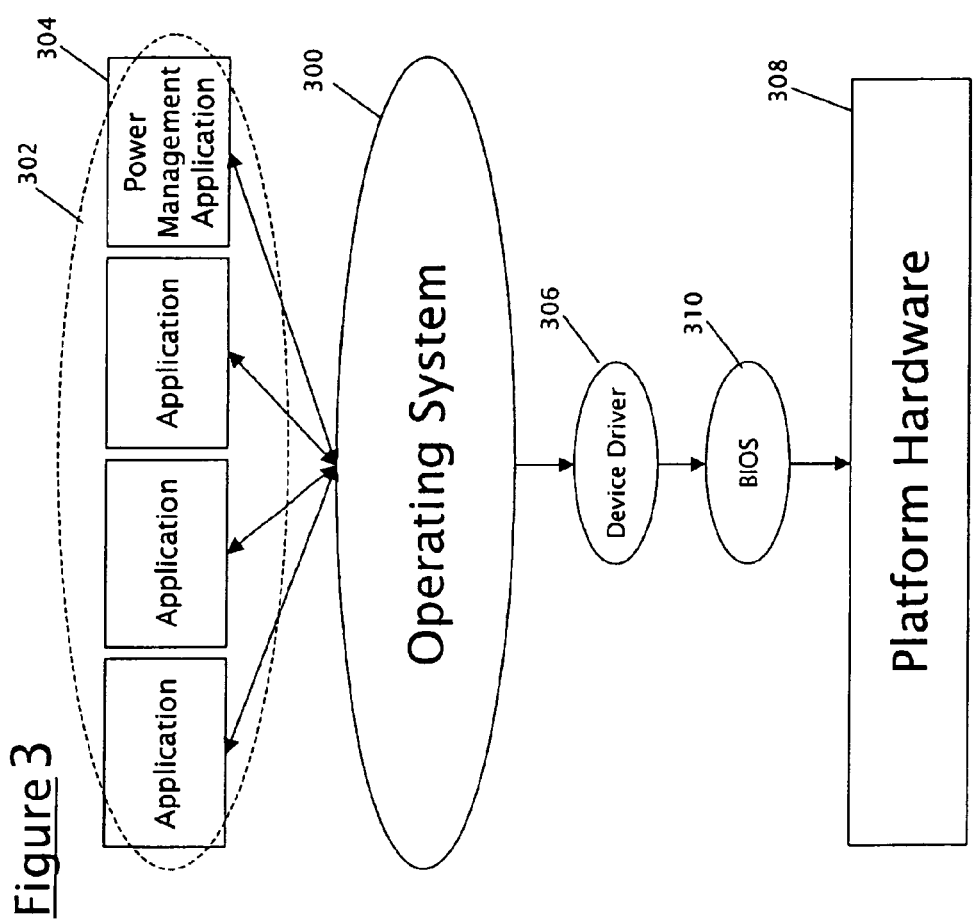
FIG. 3 illustrates an architectural system diagram depicting the operation of a data processing system according to the present invention.

Referring now to FIG. 3, an architectural system diagram depicting the operation of a data processing system according to the present invention is illustrated. In the illustrated embodiment, a plurality of application programs 302 such as power management application 304 interact with various platform hardware devices 308 including a CPU 120 via an operating system 300 such as the Windows™ operating system from Microsoft Corporation, one or more device drivers 306, and basic input/output system (BIOS) code 310. The illustrated system is interrupt-driven both with respect to the multitasking of the various applications 302 and communication between applications 302 and platform hardware 308.

Accordingly, in one embodiment of the present invention, an application 302 request for a hardware resource from within platform hardware 308 can cause an interrupt, such as a System Control Interrupt (SCI) or a System Management Interrupt (SMI) to be generated and an interrupt handler routine to be responsively executed. Interaction between operating system 300 and platform hardware 308 is then facilitated by a device driver 306 and BIOS 310. In the illustrated embodiment, BIOS 310 contains information such as physical device addresses of the various devices 308 attached to the data processing system 100 and is useful with respect to the actual transmission of data. By contrast, device driver 306 is typically specific to a particular hardware device and is usually concerned with the translation of data between various device formats.

Figure 4:
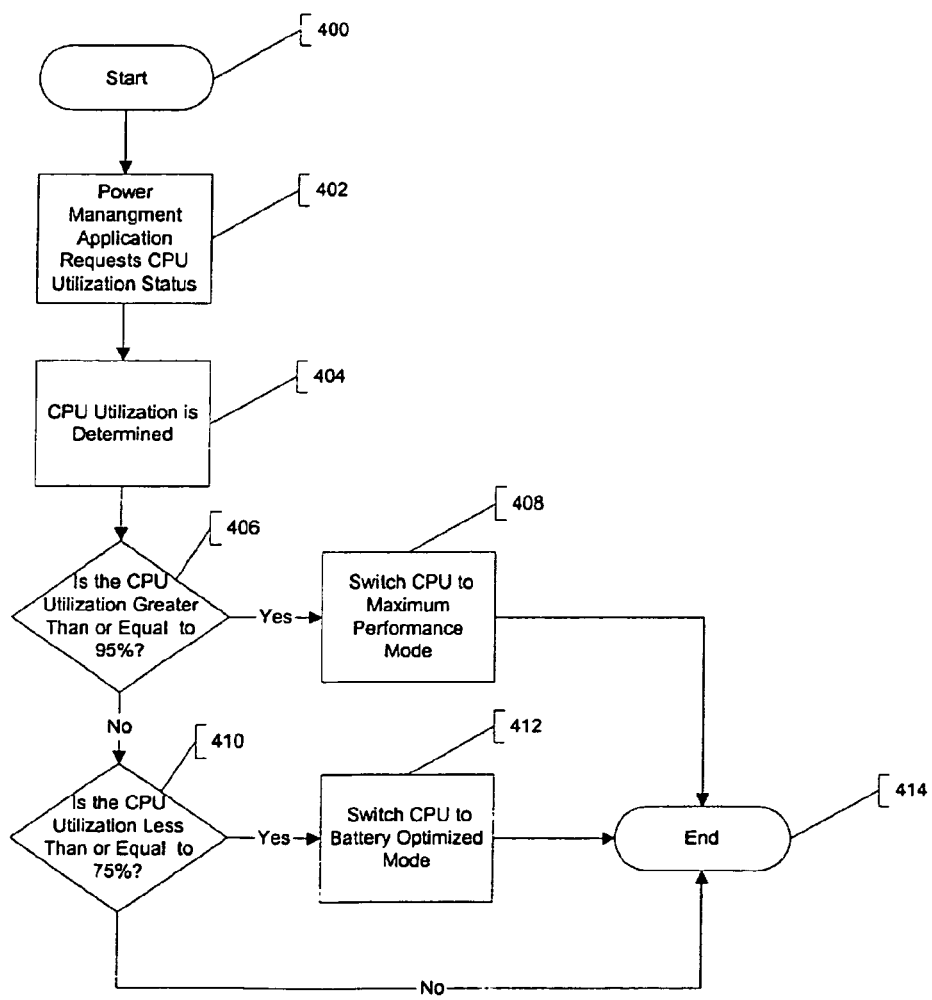
FIG. 4 illustrates a high-level logic flowchart of a first embodiment of the method of the present invention.

Referring now to FIG. 4, a high-level logic flowchart of a first embodiment of the method of the present invention is illustrated. In FIG. 4 there is depicted a technique by which a demand-based transition between two processor performance states is executed. At block 400, the illustrated process is begun and thereafter a CPU utilization status request is received from a power management application (block 402). The described utilization request may be periodic or may occur in response to relevant power management events such as thermal or processor workload events, the connection of an alternating current power supply or the like. Once the CPU utilization has been established (block 404), a determination is then made whether the calculated utilization exceeds a utilization threshold (block 406). In the illustrated embodiment, a relatively high utilization threshold of 95% is selected to identify the execution of demand-intensive applications such as DVD movie players, personal computer games, and performance benchmark tests. It should be readily appreciated however that the various utilization thresholds described herein have been selected for illustrative purposes only and that a wide range of threshold values could be substituted therefore without departing from the spirit and scope of the present invention. If the utilization threshold is exceeded, the CPU is transitioned to a maximum performance processor performance mode (block 408) and operated at a higher performance level to ensure that the execution performance of such demand-intensive application programs is not degraded.

If the utilization of the CPU is not above or equal to the 95% utilization threshold, it is then determined whether the CPU's utilization falls at or below a second utilization threshold of, in the illustrated embodiment, 75% (block 410). The processor performance level may then be matched to its current utilization level by switching the CPU to a battery optimized processor performance mode (block 412) to conserve power when the utilization level falls below this figure and a decrease in performance will be less noticeable to the end user. Otherwise the process is terminated (block 414) with the processor performance mode of the central processing unit remaining unchanged. Power may be conserved and the maximum performance mode distinguished from the battery optimized mode by the frequency at which the processor is operated. While numerous other power and performance management techniques are known and within the scope of the present invention, in one embodiment utilization of the maximum performance processor performance mode entails the operation of the central processing unit at an operating frequency of 600 MHz while the battery optimized mode entails the application of a 500 MHz central processing unit clock signal. Following any transition to either maximum performance or battery optimized mode, the process is terminated (block 414). In an alternative embodiment, factors other than an instantaneous CPU utilization and a utilization threshold may be used to select an appropriate processor performance mode such as the duration of time that the examined CPU remains at a particular utilization level or within a particular range of utilization levels.

Figure 5:
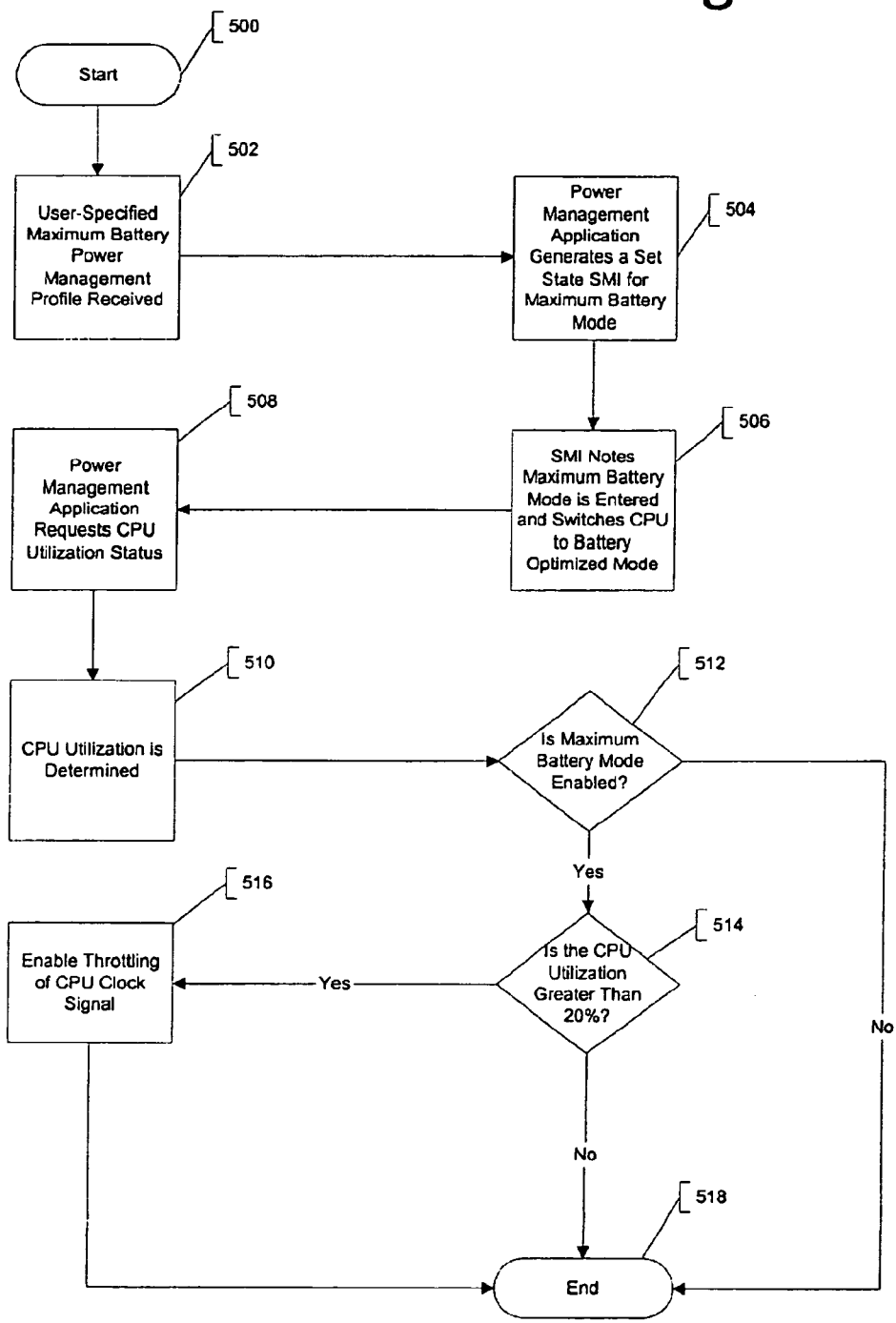
FIG. 5 illustrates a high-level logic flowchart of a second embodiment of the method of the present invention.

Referring now to FIG. 5, a high-level logic flowchart of a second embodiment of the method of the present invention is illustrated. After the process is begun (block 500) a user-specified power management profile is received (block 502) in which power conservation and system performance are prioritized generally or a specific, preferred processor performance mode may be designated. In the illustrated embodiment, a maximum battery or ultra battery optimized profile is received conveying that power conservation is to be favored over execution speed. Then an executing power management software or firmware application generates a system management interrupt (SMI) (block 504) in response to the receipt of the user power management profile which in turn transitions the CPU to battery optimized mode if necessary from whatever prior state the processor was operating in. Subsequently, the power management application issues a request for the current CPU utilization status (block 508) which is determined either by the generated SMI or directly by the power management application itself (block 510) by a method which will be described in greater detail with reference to FIG. 7 herein. In alternative embodiment, the described system management interrupt is used only to transition the system from one performance or power mode to another with both CPU utilization detection and other related tasks being performed directly by the power management application.

The user-specified power management profile is then checked to ensure that maximum battery mode is still currently enabled (block 512). If so, the resolved CPU utilization is examined to determine whether it exceeds a utilization threshold of 20% (block 514) in this embodiment. If not, the process is terminated (block 518). If the current utilization of the CPU exceeds the tuneable threshold, the CPU is transitioned from battery optimized mode to a virtual maximum battery performance mode by engaging throttling of the central processing unit clock signal at a particular frequency (block 516). Otherwise, the process ends (block 518) and the battery optimized performance mode is utilized until another transition-precipitating event occurs. Using the illustrated process allows small, bursty tasks or code segments which can be completed within the sampling time interval of the CPU utilization determination to be executed at the full, battery optimized performance level without enabling CPU clock signal throttling. Such tasks can be completed faster at this non-throttled rate, allowing the system to transition after their completion to an even lower power state than can be achieved with clock throttling, conserving more power overall.

Figure 6:
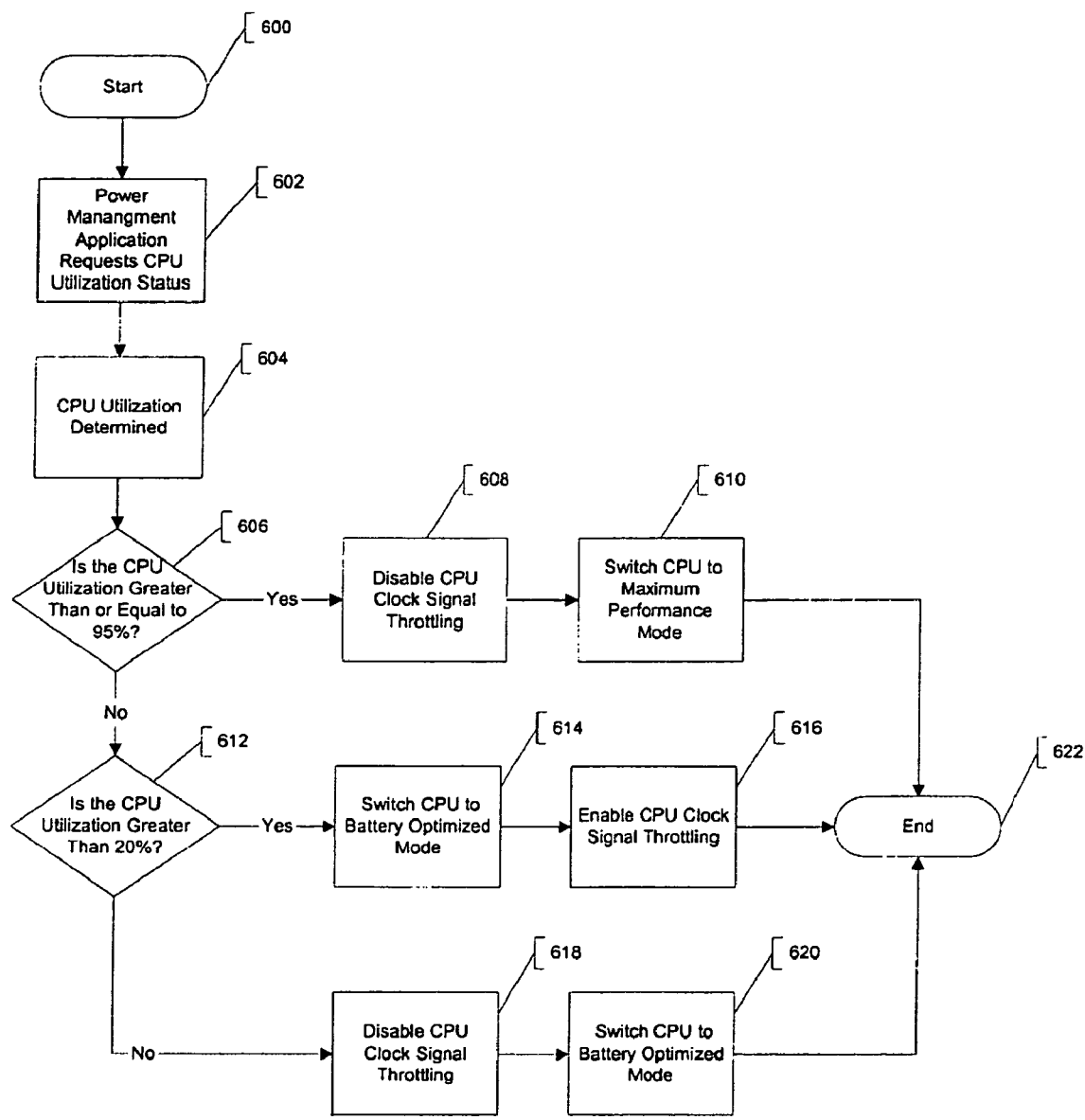
FIG. 6 illustrates a high-level logic flowchart of a third embodiment of the method of the present invention.

Referring now to FIG. 6, a high-level logic flowchart of a third embodiment of the method of the present invention is illustrated. The beginning of the process is depicted at block 600 and thereafter a CPU utilization status request is received from a power management application (block 602). Once the CPU utilization has been established (block 604), a determination is made whether the calculated utilization exceeds a utilization threshold (block 606). In the illustrated embodiment, a relatively high utilization threshold of 95% is selected for this first utilization threshold as illustrated. If the utilization threshold is exceeded, any previously applied CPU clock signal throttling is disabled (block 608) and the CPU is transitioned to a maximum performance processor performance mode (block 610) and operated at a higher performance level to ensure that the execution performance of demand-intensive application programs is not degraded.

If the utilization of the CPU is not above or equal to the 95% utilization threshold, it is then determined whether the CPU's utilization falls at or below a second utilization threshold of, in the illustrated embodiment, 20% (block 612). If the current CPU utilization level is not greater than the 20% utilization threshold, the CPU is operated in battery optimized mode (block 620) and clock throttling is disabled (block 618) such that power saving states such as the C2 and C3 states defined by the well known Advanced Configuration and Power Interface Specification, Revision 2.0, Jul. 27, 2000 (ACPI) can be entered more quickly following completion of the CPU workload. Lastly, for CPU utilizations falling in between the two utilization thresholds, the CPU is transitioned to and operated in maximum battery mode by entering battery optimized mode (block 614) and enabling clock throttling for the applied CPU clock (block 616). Consequently, the performance of CPU workloads having a consistent, intermediate demand intensity is reduced and the completion time is extended in order to reduce the total amount of power consumed. Following any transition to (or retention of) any of the above-described power management performance modes (maximum performance, battery optimized mode, and maximum battery) the process is terminated (block 622).

Figure 7:
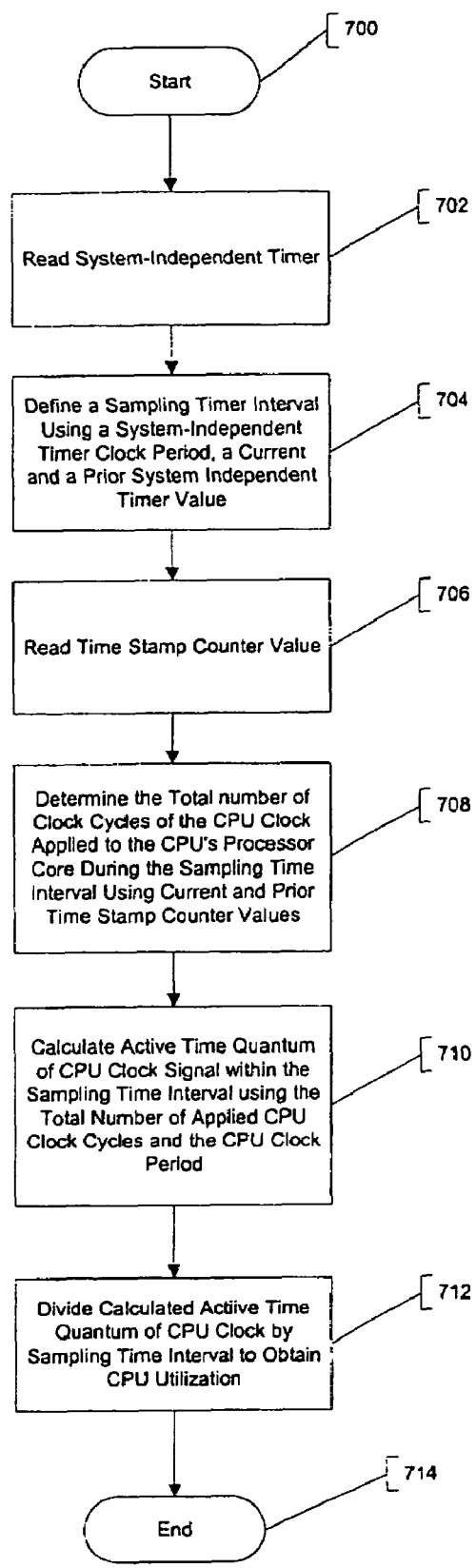
FIG. 7 illustrates a high-level logic flowchart of a method of determining the utilization of a central processing unit according to one embodiment of the present invention.

Referring now to FIG. 7, a high-level logic flowchart of a method of determining the utilization of a central processing unit according to one embodiment of the present invention is illustrated. FIG. 7 depicts a technique by which a the utilization of a CPU may be determined independently of a data processing system's operating system. In one embodiment, this method is utilized to determine CPU utilization within the various method embodiments of the present invention such as at blocks 404, 510, and 604 of FIGS. 4, 5, and 6, respectively. The process illustrated by FIG. 7 begins at block 700. Thereafter, a system-independent timer such as an ACPI chipset-compliant power management timer or Windows™ performance counter is read. (block 702). Next, a sampling time interval is defined using the independent timer's clock period, as well as currently and previously read system-independent timer values (block 704). A value is then read from a time stamp counter (block 706) which is incremented for each cycle or "clock" of a CPU clock signal which is applied to the processor core 200 of central processing unit 120. Using a previously read time stamp counter value and the currently read value, the total number of CPU clock signal ticks or cycles applied to the CPU's processor core 200 during the sampling time interval may be obtained (block 708). Thereafter, the total amount or "quantum" of time within the sampling time interval during which the CPU clock signal was active within the CPU's processor core 200 can be derived using the accumulated number of CPU clock cycles and the CPU clock signal's period (block 710). CPU utilization may then be expressed as a ratio of this active CPU clock signal time to the sampling time interval (block 712). Thereafter, the process is terminated (block 714).

Figure 8:
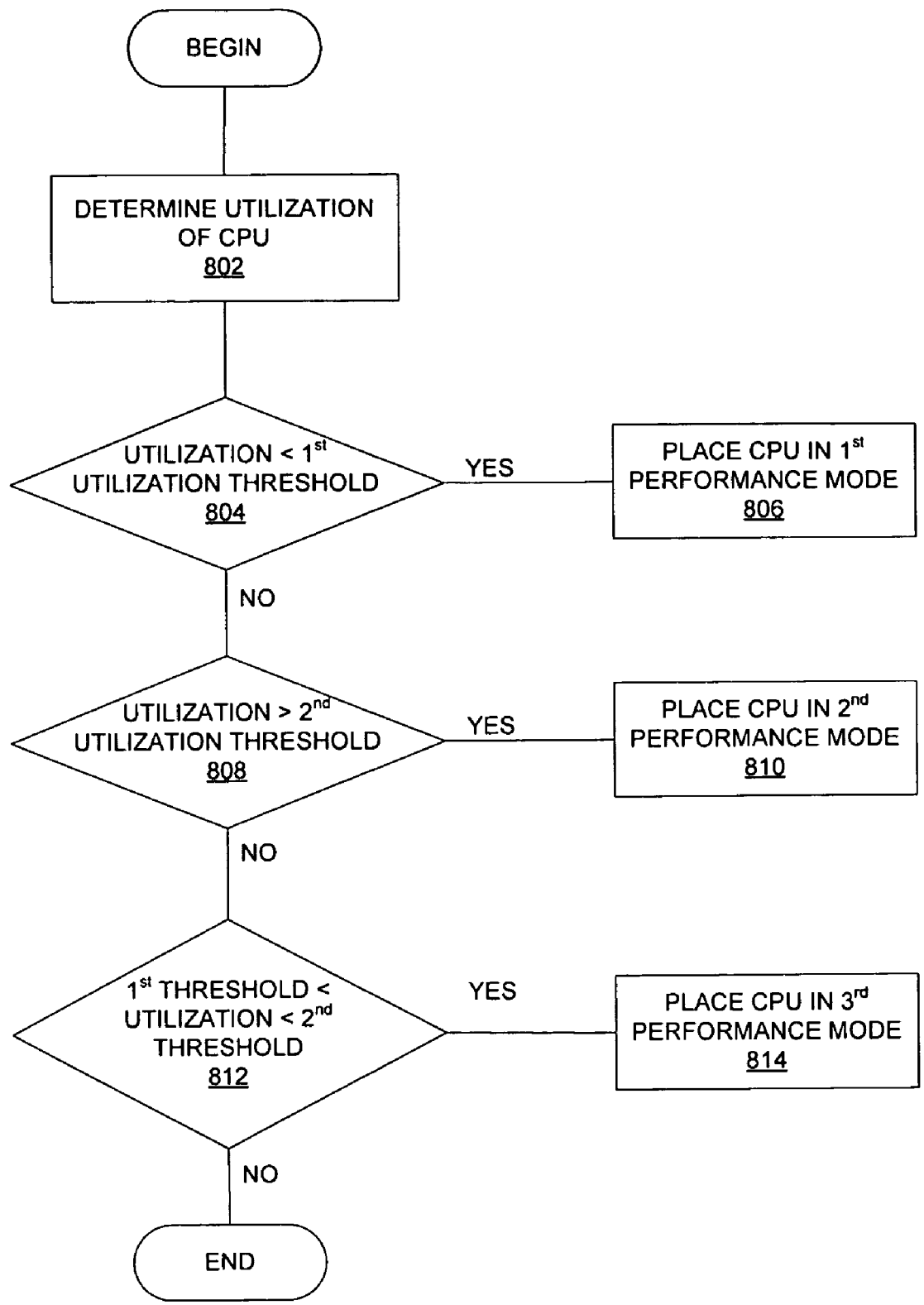
FIG. 8 illustrates a high-level logic flowchart of a fourth embodiment of the method of the present invention.

Referring now to FIG. 8, a high-level logic flowchart of a fourth embodiment of the method of the present invention is illustrated. At 802, a CPU utilization is determined in response to a status request from a power management application. Once the CPU utilization has been established, a determination is made as to the relationship of the calculated CPU utilization with respect to a first, a second, and a third utilization threshold.

At 804, if the CPU utilization is determined to be less than or equal to the first utilization threshold, the central processing unit is placed in a first performance mode at 806.

At 808, if the CPU utilization is determined to be greater than a second utilization threshold, the first utilization threshold being lower than the second utilization threshold, the central processing unit is placed in a second performance mode at 810.

At 812, if the CPU utilization is determined to be between the first utilization threshold and the second utilization threshold, the central processing unit is placed in a third performance mode at 814. When the central processing unit is placed in the third performance mode, the central processing unit operates in the first performance mode and reduces a clock frequency of the CPU.

In accordance with one embodiment, the first performance mode includes the battery optimized mode as previously described. The second performance mode includes the maximum performance mode as previously described. The third performance mode includes the maximum battery performance mode as previously described.

Figure 9:
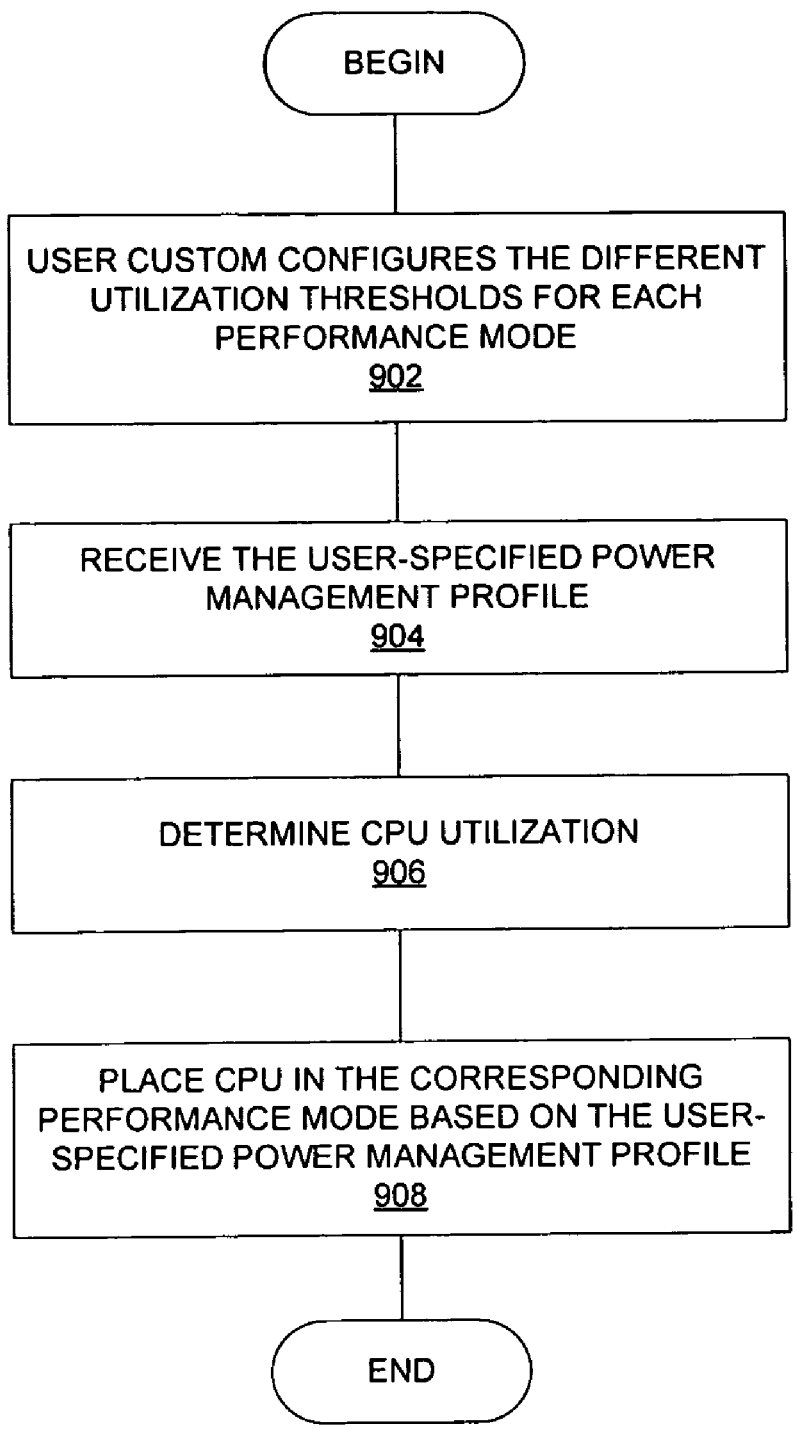
FIG. 9 illustrates a high-level logic flowchart of a fifth embodiment of the method of the present invention.

Referring now to FIG. 9, a high-level logic flowchart of a fifth embodiment of the method of the present invention is illustrated. At 902, the value of the each utilization threshold may be configured by a user in a user-specified power management profile. At 904, the previously custom configured user-specified power management profile is received.

At 906, the CPU utilization is determined in response to a status request from a power management application. Once the CPU utilization has been established, a determination is made as to the relationship of the calculated CPU utilization with respect to the previously configured utilization threshold as stored in the user-specified power management profile. The CPU is then placed in the corresponding performance mode at 908.

It should be noted that the processor discussed in the present application is not limited to a Central Processing Unit but may include also other similar components such as a chipset. Further, the processor may also be powered by a DC power source. The DC power source may include but is not limited to fuel cells and batteries.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A method comprising:
   determining a utilization of a processor;
   placing the processor in a first performance mode in response to a determination that the utilization is less than or equal to a first utilization threshold;

placing the processor in a second performance mode in response to a determination that the utilization is greater than a second utilization threshold, the first utilization threshold being lower than the second utilization threshold; and placing the processor in a third performance mode in response to a determination that the utilization is between the first utilization threshold and the second utilization threshold, wherein placing the processor in the third performance mode includes operating the processor in the first performance mode and operating with a clock frequency that is lower than the clock frequency of the processor in the first and second performance modes.

2. The method of claim 1, wherein a voltage level of the processor is lower in the first performance mode than in the second performance mode.

3. The method of claim 1, wherein a voltage level of the processor is higher in the second performance mode than in the first performance mode and in the third performance mode.

4. The method of claim 1, wherein a voltage level of the processor is also lower in the third performance mode than in the second performance mode.

5. The method of claim 1, further comprising:
placing the processor in a fourth performance mode in response to a determination that the utilization is between the first utilization threshold and a third utilization threshold, the third utilization threshold between the first utilization threshold and the second utilization threshold.

6. The method of claim 5, further comprising:
placing the processor in a fifth performance mode in response to a determination that the utilization is between the second utilization threshold and the third utilization threshold.

7. A computer storage medium having a plurality of instructions executable by a computer system embodied therein, wherein said instructions when executed to cause said computer system to perform the following operations, comprising:
determining a utilization of a central processor;
placing the central processor in a first performance mode in response to a determination that the utilization is less than or equal to a first utilization threshold;
placing the central processor in a second performance mode in response to a determination that the utilization is greater than a second utilization threshold, the first utilization threshold being lower than the second utilization threshold; and
placing the central processor in a third performance mode in response to a determination that the utilization is between the first utilization threshold and the second utilization threshold,
wherein placing the central processor in the third performance mode includes operating the central processor in the first performance mode and operating with a clock frequency that is lower than the clock frequency of the processor in the first and second performance modes.

8. The computer storage medium of claim 7, wherein a voltage level of the central processor is lower in the first performance mode than in the second performance mode.

9. The computer storage medium of claim 7, wherein a voltage level of the central processor is higher in the second performance mode than in the first performance mode and in the third performance mode.

10. The computer storage medium of claim 7, wherein a voltage level of the central processor is also lower in the third performance mode than in the second performance mode.

11. A data processing system comprising:
a central processing unit to process data and execute instructions;
a memory to store a plurality of instructions which when executed by the central processing unit cause the data processing system to:
determining a utilization of the central processing unit;
placing the central processing unit in a first performance mode in response to a determination that the utilization is less than or equal to a first utilization threshold;
placing the central processing unit in a second performance mode in response to a determination that the utilization is greater than a second utilization threshold, the first utilization threshold being lower than the second utilization threshold; and
placing the central processing unit in a third performance mode in response to a determination that the utilization is between the first utilization threshold and the second utilization threshold,
wherein placing the central processing unit in the third performance mode includes operating the central processing unit in the first performance mode and operating with a clock frequency that is lower than the clock frequency of the processor in the first and second performance modes.

12. The data processing system of claim 11, wherein a voltage level of the central processing unit is lower in the first performance mode than in the second performance mode.

13. The data processing system of claim 11, wherein a voltage level of the central processing unit is higher in the second performance mode than in the first performance mode and the third performance mode.

14. The data processing system of claim 11, wherein a voltage level of the central processing unit is also lower in the third performance mode than in the second performance mode.

* * * * *

UNITED STATES PATENT AND TRADEMARK OFFICE
CERTIFICATE OF CORRECTION

PATENT NO. : 7,596,709 B2 Page 1 of 1
APPLICATION NO. : 11/478119
DATED : September 29, 2009
INVENTOR(S) : Cooper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 209 days.

Signed and Sealed this

Twenty-eighth Day of September, 2010

David J. Kappos
*Director of the United States Patent and Trademark Office*